(12) United States Patent
Takahashi (10) Patent No.: US 11,225,985 B2
(45) Date of Patent: Jan. 18, 2022

(54) FLUID LEAKAGE DETECTION DEVICE AND RECIPROCATING FLUID PRESSURE DEVICE

(71) Applicant: KYB Corporation, Tokyo (JP)

(72) Inventor: Yusuke Takahashi, Gifu (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/961,607

(22) PCT Filed: Jan. 18, 2019

(86) PCT No.: PCT/JP2019/001402
§ 371 (c)(1),
(2) Date: Jul. 10, 2020

(87) PCT Pub. No.: WO2019/146513
PCT Pub. Date: Aug. 1, 2019

(65) Prior Publication Data
US 2021/0079936 A1    Mar. 18, 2021

(30) Foreign Application Priority Data

Jan. 29, 2018 (JP) .............................. JP2018-012565

(51) Int. Cl.
*F15B 15/14* (2006.01)
*F16J 15/3236* (2016.01)

(52) U.S. Cl.
CPC ...... *F15B 15/1428* (2013.01); *F15B 15/1461* (2013.01); *F16J 15/3236* (2013.01)

(58) Field of Classification Search
CPC .. F15B 15/1428; F15B 20/005; F15B 19/005; F15B 15/1461; G01M 3/16; F16J 15/3236
See application file for complete search history.

(56) References Cited

FOREIGN PATENT DOCUMENTS

| CN | 104006029 A | 8/2014 | |
|---|---|---|---|
| JP | S56158561 U | 11/1981 | |
| JP | 62240275 A1 * | 10/1987 | ............. F15B 20/00 |
| JP | S62-240275 A | 10/1987 | |

\* cited by examiner

*Primary Examiner* — Abiy Teka
(74) *Attorney, Agent, or Firm* — Rabin & Berdo, P.C.

(57) ABSTRACT

A fluid leakage detection device includes: an annular member attached to a cylinder head, the annular member being configured such that a piston rod is inserted through the annular member; a passage formed in the annular member, the passage being configured such that a working fluid is guided to the passage from a gap between an outer circumference of the piston rod and an inner circumference of the cylinder head; and a detector configured to detect the working fluid guided through the passage, wherein the annular member includes a press-fitted portion, the press-fitted portion being configured to be press-fitted to an annular groove formed in the cylinder head.

11 Claims, 7 Drawing Sheets

FLUID LEAKAGE DETECTION DEVICE AND RECIPROCATING FLUID PRESSURE DEVICE

TECHNICAL FIELD

The present invention relates to a fluid leakage detection device and a reciprocating fluid pressure device.

BACKGROUND ART

In a reciprocating fluid pressure device such as a fluid pressure cylinder, a shock absorber, and so forth, a working fluid may leak from a gap between a cylinder head and a piston rod due to deterioration of a seal member provided in an inner circumference of the cylinder head. As a leaked amount of the working fluid is increased, there is a risk in that the reciprocating fluid pressure device becomes unable to exhibit a desired performance. For such a reason, it has been proposed to attach a fluid leakage detection device to the cylinder head in order to detect the leakage of the working fluid (see JP S62-240275A).

SUMMARY OF INVENTION

The fluid leakage detection device that is disclosed in JP S62-240275A is attached to the cylinder head by means of bolts. Thus, in order to attach this fluid leakage detection device to the cylinder head of the reciprocating fluid pressure device, a hole for fixing the bolt needs to be formed in the cylinder head, and it is not possible to attach the fluid leakage detection device with ease.

An object of the present invention is to enable easy attachment of a fluid leakage detection device to a cylinder head.

According to one aspect of the present invention, a fluid leakage detection device includes: an annular member attached to a cylinder head, the annular member being configured such that a piston rod is inserted through the annular member; a passage formed in the annular member, the passage being configured such that a working fluid is guided to the passage from a gap between an outer circumference of the piston rod and an inner circumference of the cylinder head; and a detector configured to detect the working fluid guided through the passage, wherein the annular member includes a press-fitted portion, the press-fitted portion being configured to be press-fitted to an annular groove formed in the cylinder head.

DESCRIPTION OF EMBODIMENT

A fluid leakage detection device 100 according to an embodiment of the present invention and a hydraulic cylinder 1 serving as a reciprocating fluid pressure device provided with the fluid leakage detection device 100 will be described below with reference to the drawings.

Figure 1:
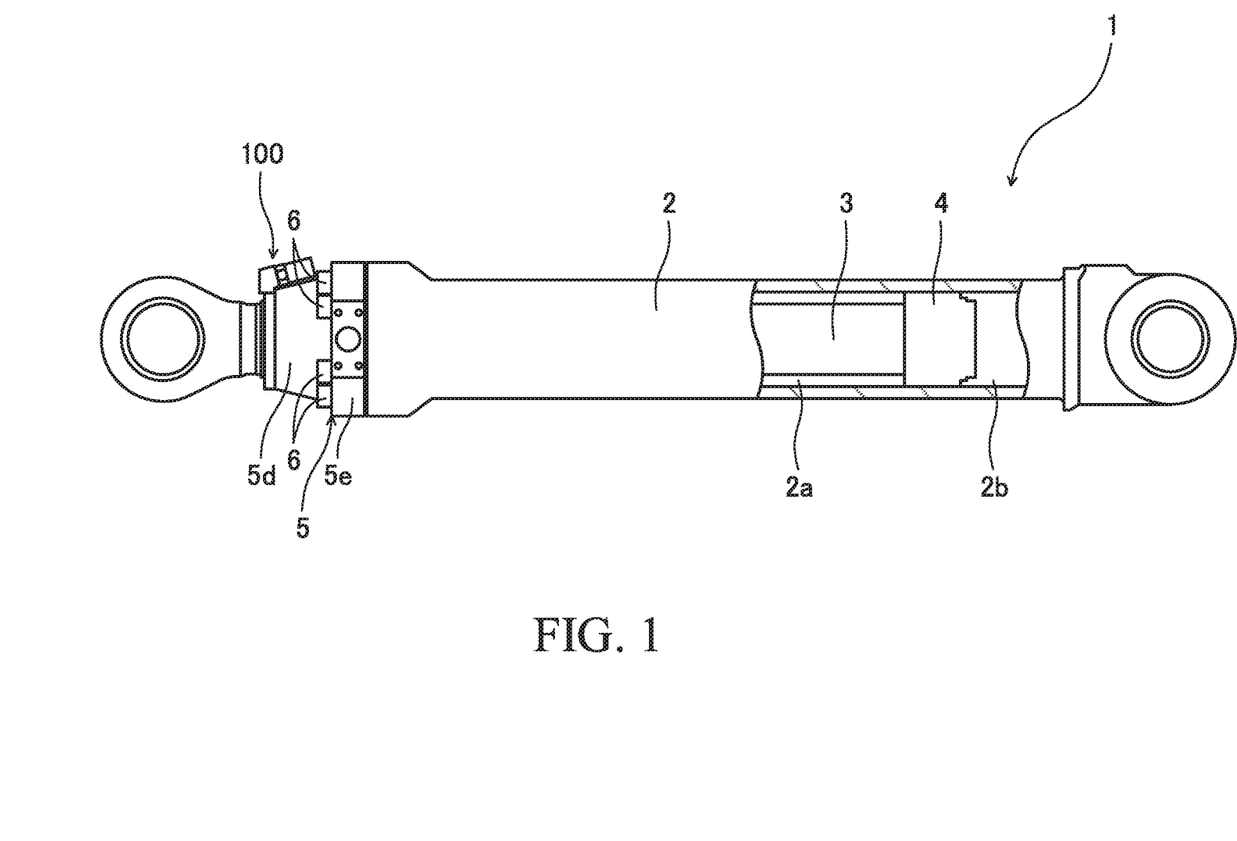
FIG. 1 is a partial sectional view of a hydraulic cylinder according to an embodiment of the present invention.

As shown in FIG. 1, the hydraulic cylinder 1 includes a cylindrical cylinder tube 2, a piston rod 3 that is inserted into the cylinder tube 2, and a piston 4 that is connected to a tip end of the piston rod 3. The piston 4 is provided so as to be freely slidable along an inner circumferential surface of the cylinder tube 2, and an inside of the cylinder tube 2 is partitioned by the piston 4 into a rod-side chamber 2a and an anti-rod side chamber 2b.

The piston rod 3 extends out from an opening end of the cylinder tube 2. As working oil is selectively guided from a hydraulic pressure source (not shown) to the rod-side chamber 2a or the anti-rod side chamber 2b, the piston rod 3 is moved relative to the cylinder tube 2. As a result, the hydraulic cylinder 1 is extended or contracted.

A cylinder head 5 through which the piston rod 3 is inserted is provided on the opening end of the cylinder tube 2. The cylinder head 5 is fastened to the opening end of the cylinder tube 2 by using a plurality of bolts 6 serving as fastening members.

Figure 2:
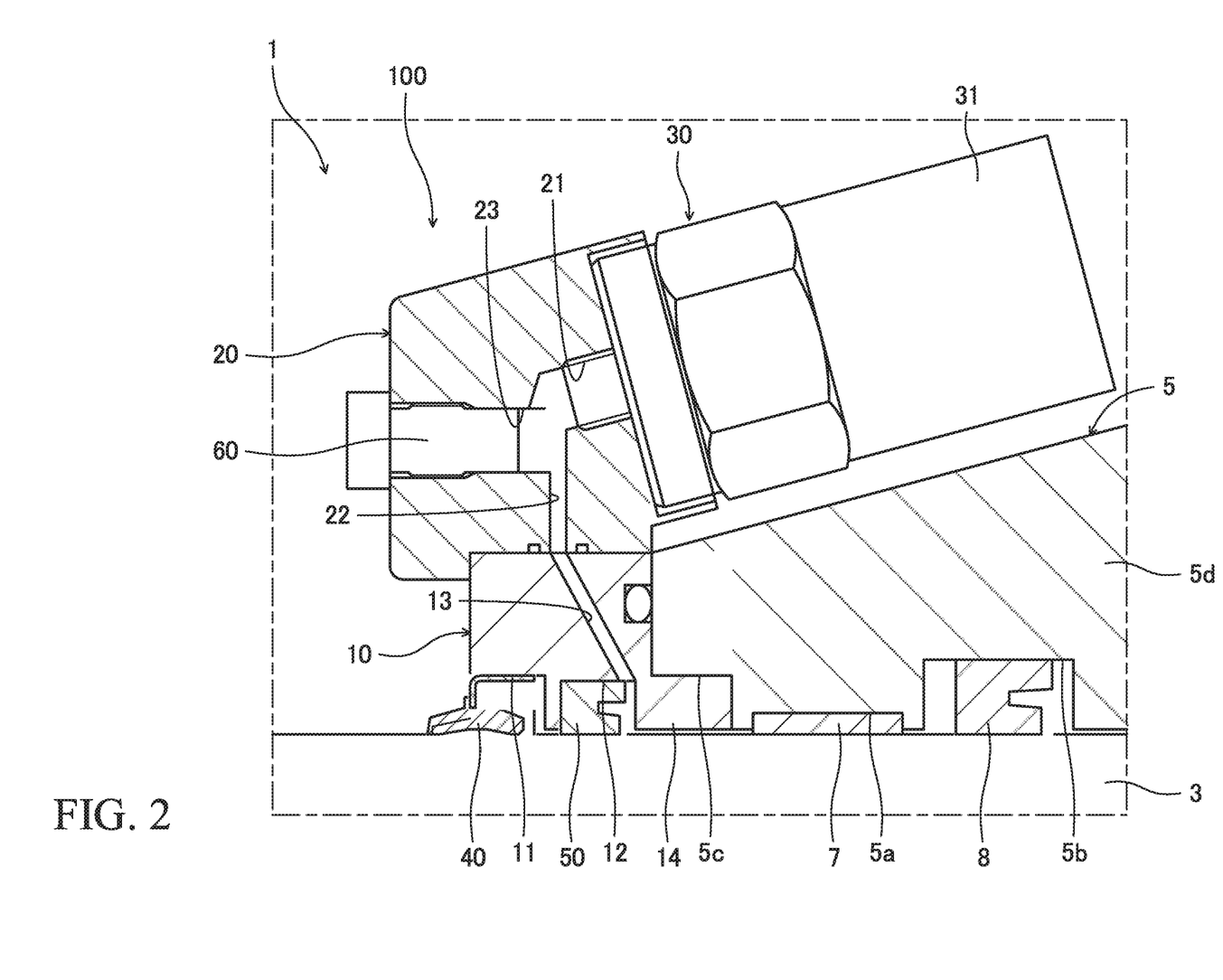
FIG. 2 is an enlarged sectional view of the hydraulic cylinder shown in FIG. 1 and shows a fluid leakage detection device.

As shown in FIG. 2, annular grooves 5a and 5b are formed in an inner circumference of the cylinder head 5. A bush 7 serving as a bearing that supports the piston rod 3 in a freely slidable manner is disposed in the annular groove 5a.

A U-packing 8 serving as a seal member is disposed in the annular groove 5b. The U-packing 8 is compressed between an outer circumference of the piston rod 3 and the inner circumference of the cylinder head 5, thereby sealing a gap between them. With such a configuration, it is possible to prevent the working oil in the rod-side chamber 2a (see FIG. 1) from leaking to the outside.

In the above, although the bush 7 and the U-packing 8 are provided in the inner circumference of the cylinder head 5 in this order in the direction in which the hydraulic cylinder 1 contracts, they may be provided in the reversed order.

A sealing property of the U-packing 8 is deteriorated gradually as it is worn by the extension and contraction of the hydraulic cylinder 1, in other words, the reciprocating movement of the piston rod 3. As the sealing property is deteriorated, the amount of the working oil leaking from the rod-side chamber 2a through the gap between the outer circumference of the piston rod 3 and the inner circumference of the cylinder head 5 is increased. As the leaked amount of the working oil is increased, there is a risk in that the hydraulic cylinder 1 becomes unable to exhibit a desired performance. In order to ascertain the deterioration of the property of the hydraulic cylinder 1 due to the leakage of the working oil, the hydraulic cylinder 1 is provided with the fluid leakage detection device 100.

The fluid leakage detection device 100 will be described below in detail with reference to FIGS. 2 and 3.

Figure 3:
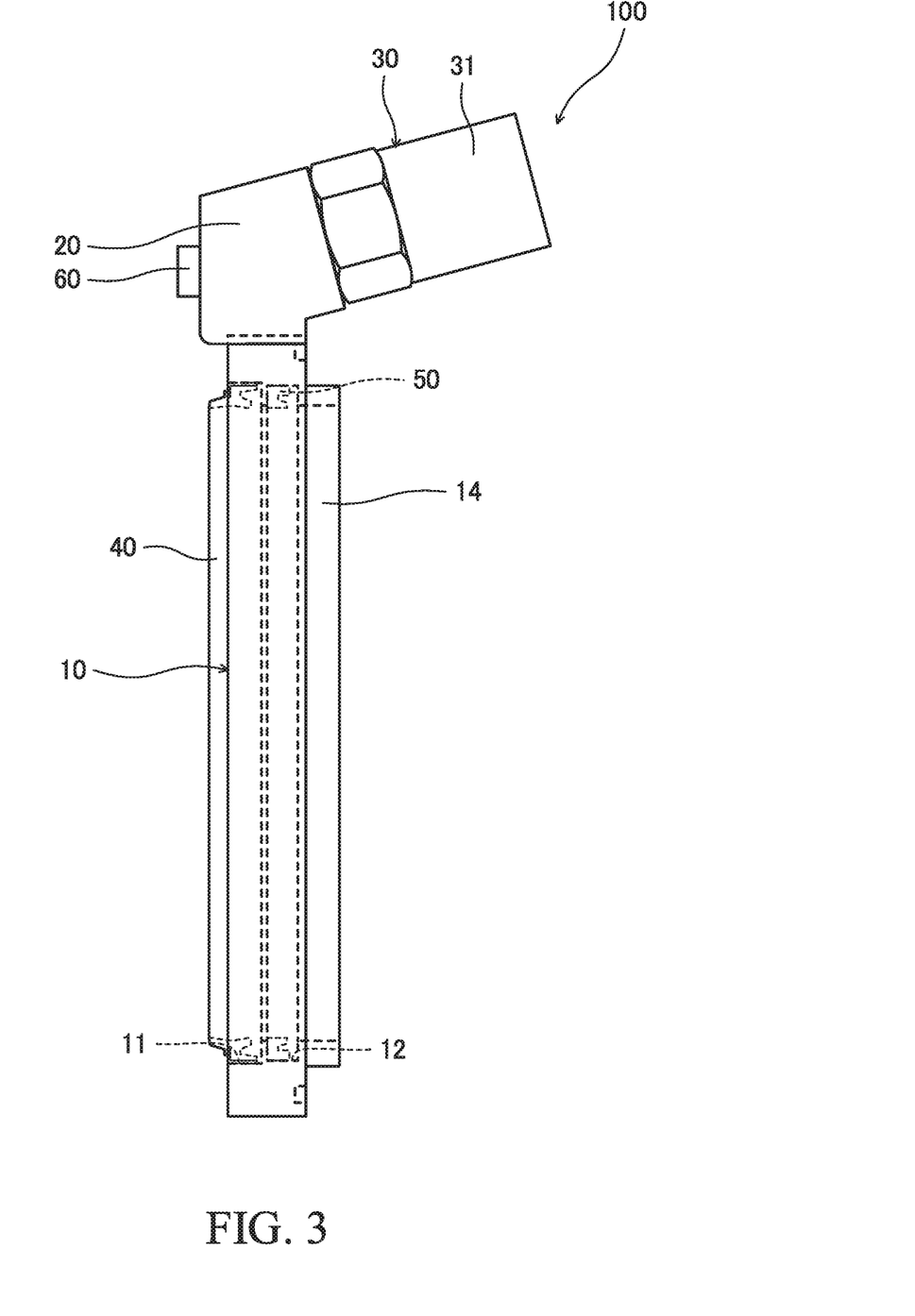
FIG. 3 is a front view of the fluid leakage detection device according to the embodiment of the present invention.

As shown in FIGS. 2 and 3, the fluid leakage detection device 100 includes an annular member 10 that is attached to a tip end of the cylinder head 5 such that the piston rod 3 is inserted therethrough, a sensor holder 20 that is provided on the outer circumference of the annular member 10, and a pressure sensor 30 serving as a detector that is held by the sensor holder 20. The sensor holder 20 is fastened to the annular member 10 by using a bolt (not shown). The pressure sensor 30 is fixed to a hole 21 formed in the sensor holder 20 by being screwed into the hole 21.

Annular grooves 11 and 12 are formed in an inner circumference of the annular member 10. A dust seal 40 that prevents invasion of the dusts into the cylinder tube 2 from the outside is press-fitted into the annular groove 11, and a U-packing 50 serving as a seal member is arranged in the annular groove 12. The dust seal 40 and the U-packing 50 are provided in this order in the direction in which the hydraulic cylinder 1 contracts.

The U-packing 50 is compressed between the outer circumference of the piston rod 3 and the inner circumference of the annular member 10, thereby sealing a gap between them. With such a configuration, it is possible to prevent the working oil, which has been guided to the annular groove 12 from the rod-side chamber 2a (see FIG. 1) through the gap between the outer circumference of the piston rod 3 and the inner circumference of the cylinder head 5, from leaking to the annular groove 11.

In the annular member 10, a passage 13 is formed so as to penetrate through between a bottom surface of the annular groove 12 and the outer circumference of the annular member 10. The U-packing 50 is arranged in the annular groove 12 so as not to close an opening of the passage 13, and thus, the working oil that has been guided to the annular groove 12 flows into the passage 13.

In the sensor holder 20, a passage 22 is formed such that the passage 13 in the annular member 10 and the hole 21 in the sensor holder 20 are communicated therethrough. Thus, the working oil that has entered the passage 13 is then guided to the hole 21 in the sensor holder 20 through the passage 22.

The pressure sensor 30 is attached to the sensor holder 20 so as to detect the pressure of the working oil that has been guided to the hole 21 in the sensor holder 20. The pressure in the hole 21 is increased as the amount of the working oil guided to the hole 21 is increased. In addition, the amount of the working oil guided to the hole 21 is increased as the amount of the working oil that has leaked from the rod-side chamber 2a (see FIG. 1) through the gap between the outer circumference of the piston rod 3 and the inner circumference of the cylinder head 5 is increased. Therefore, by measuring the pressure in the hole 21 using the pressure sensor 30, it becomes possible to ascertain the leaked amount of the working oil.

In addition, because the leaked amount of the working oil is increased as the U-packing 8 is deteriorated, by ascertaining the leaked amount of the working oil, it becomes possible to ascertain a degree of the deterioration of the U-packing 8. Specifically, the pressure sensor 30 transmits a signal corresponding to the detected pressure to a processing unit (not shown) by a transmitter 31 in a wireless or wired manner. The processing unit determines a deteriorated state of the U-packing 8 on the basis of the detected pressure. When the detected pressure is equal to or lower than the preset threshold value, the processing unit determines that it has not reached the replacement timing of the U-packing 8. When the detected pressure exceeds the preset threshold value, the processing unit determines that it has reached the replacement timing of the U-packing 8, and an operator is notified that it has reached the replacement timing of the U-packing 8 by a warning lamp (not shown), etc.

As described above, with the hydraulic cylinder 1, it is possible to know the degree of the deterioration of the U-packing 8 on the basis of the pressure detected by the pressure sensor 30 of the fluid leakage detection device 100. Therefore, it is possible to manage the replacement timing of the U-packing 8 with ease.

Next, a structure for attaching the fluid leakage detection device 100 to the cylinder head 5 of the hydraulic cylinder 1 will be described.

The annular member 10 has a press-fitted portion 14 that is to be press-fitted to an annular groove 5c formed in the cylinder head 5. Specifically, in a state before the press-fitted portion 14 is press-fitted to the annular groove 5c, the outer diameter of the press-fitted portion 14 is slightly larger relative to the inner diameter of the annular groove 5c. Thus, in a state in which the press-fitted portion 14 is press-fitted to the annular groove 5c, the press-fitted portion 14 is squeezed in the annular groove 5c. With such a configuration, the press-fitted portion 14 is clamped in the annular groove 5c, and thereby, the annular member 10 is attached to the cylinder head 5.

As described above, with the fluid leakage detection device 100, by press-fitting the press-fitted portion 14 to the annular groove 5c, it is possible to attach the annular member 10 to the cylinder head 5. Therefore, it is possible to attach the fluid leakage detection device 100 to the cylinder head 5 without forming a hole for fixing a fastening member, such as a bolt, etc., to the cylinder head 5.

In addition, because the annular member 10 is attached to the cylinder head 5 by press-fitting the press-fitted portion 14 to the annular groove 5c, it is possible to easily adjust a position of the pressure sensor 30 in the circumferential direction when the annular member 10 is attached to the cylinder head 5.

Figure 5:
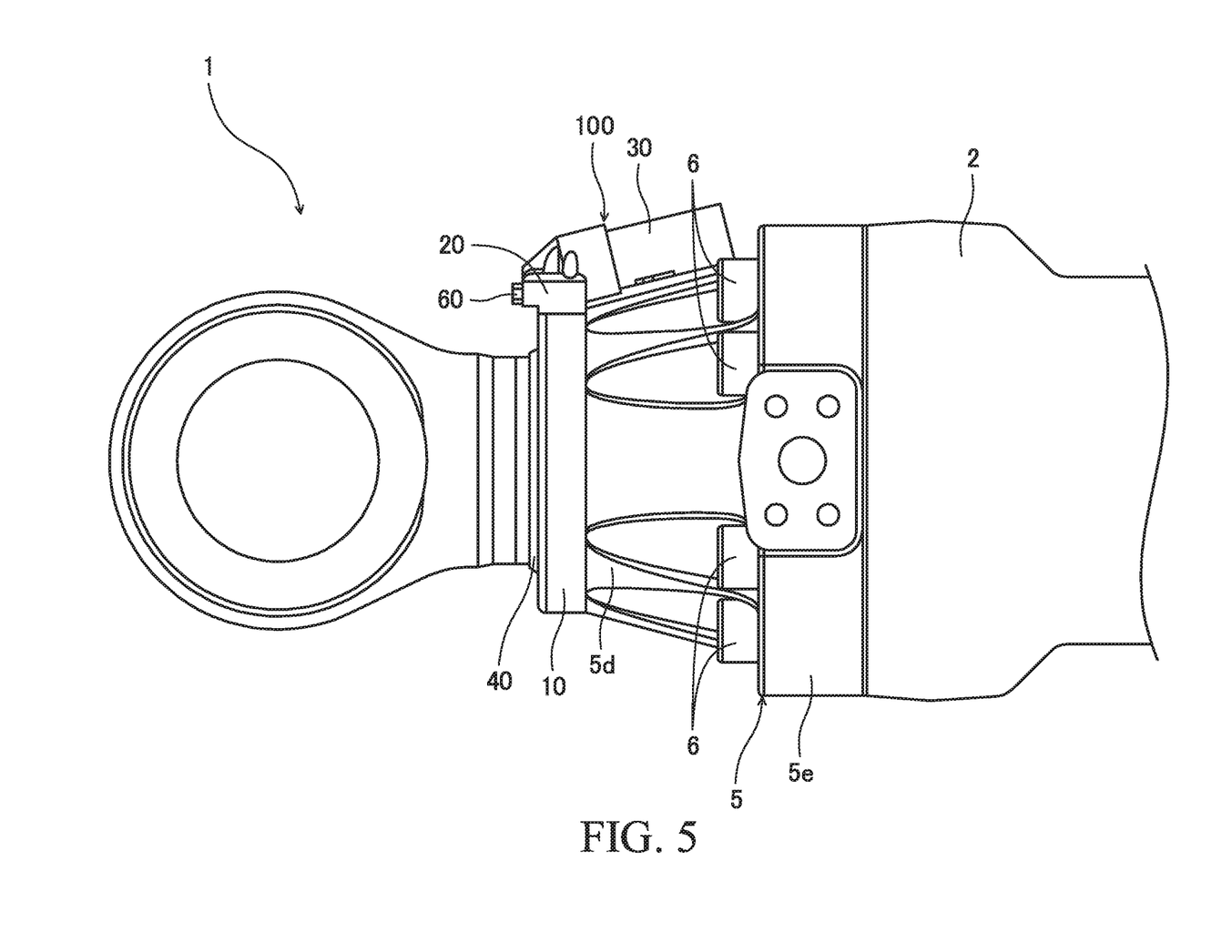
FIG. 5 is an enlarged view showing a vicinity of a cylinder head.
Figure 6:
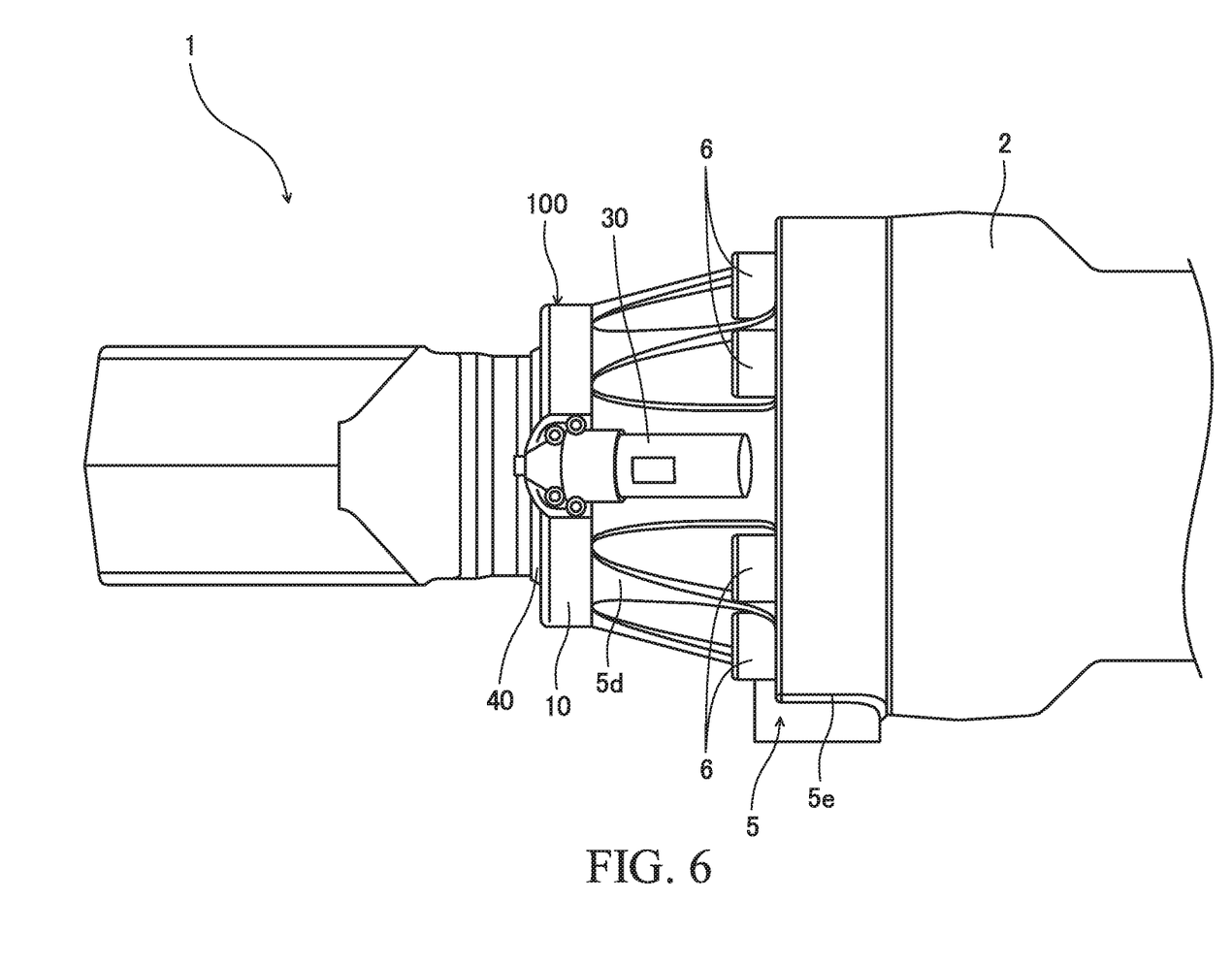
FIG. 6 is an enlarged view showing a vicinity of the cylinder head and shows a state in which the cylinder head is rotated by 90 degrees about its axis from the state shown in FIG. 5.

As shown in FIGS. 2, 5, and 6, the cylinder head 5 has a holding portion 5d that holds the bush 7 and the U-packing 8 and a flange portion 5e that radially projects out from the holding portion 5d. The flange portion 5e is formed with a plurality of holes (not shown) that penetrate therethrough in the axis direction. The bolts 6 are respectively inserted into the holes formed in the flange portion 5e, thereby pressing the flange portion 5e against the opening end of the cylinder tube 2.

Figure 7:
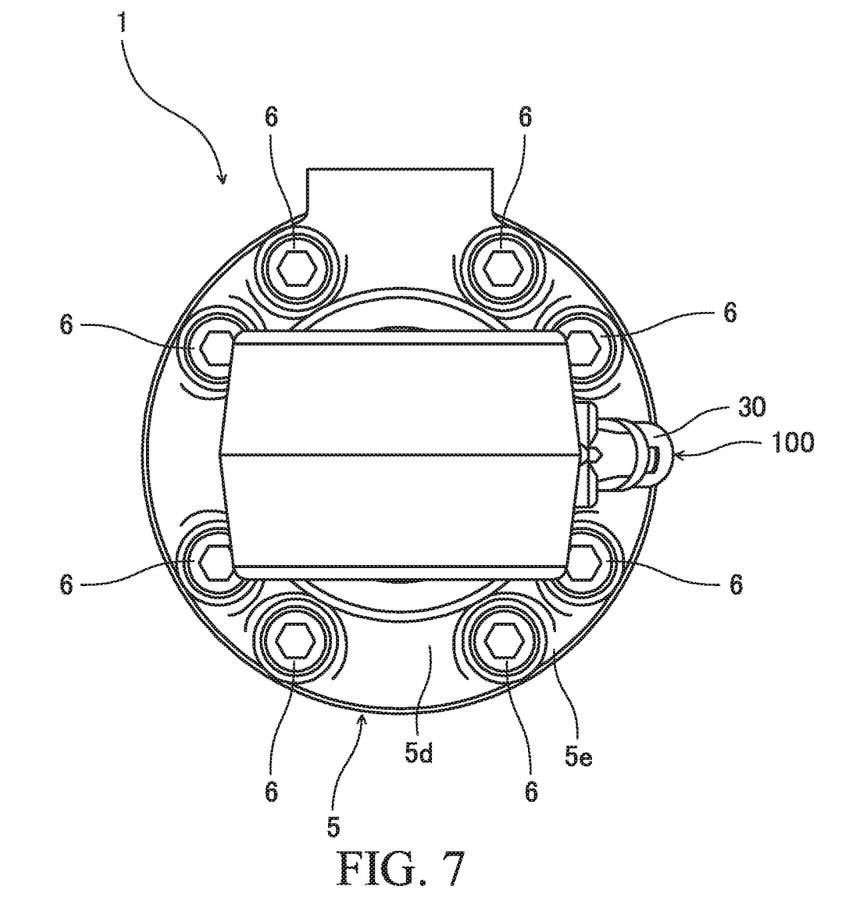
FIG. 7 is a diagram of the hydraulic cylinder shown in FIG. 1 viewed from the axis direction.

The bolts 6 are arranged side by side along the circumferential direction and protrude in the axis direction from the flange portion 5e of the cylinder head 5. The fluid leakage detection device 100 is attached to the tip end of the cylinder head 5 such that the pressure sensor 30 is arranged between the bolts 6 that are adjacent to each other along the circumferential direction. Thus, it is possible to prevent interference between the pressure sensor 30 and the bolts 6. Therefore, the pressure sensor 30 can be arranged in the vicinity of the flange portion 5e of the cylinder head 5, and it is possible to reduce the size of the hydraulic cylinder 1.

In order to achieve the object of reducing the size of the hydraulic cylinder 1, it suffices to arrange the pressure sensor 30 between the bolts 6, and the fluid leakage detection device 100 may be attached to the cylinder head 5 by other methods than the press-fitting.

Figure 4:
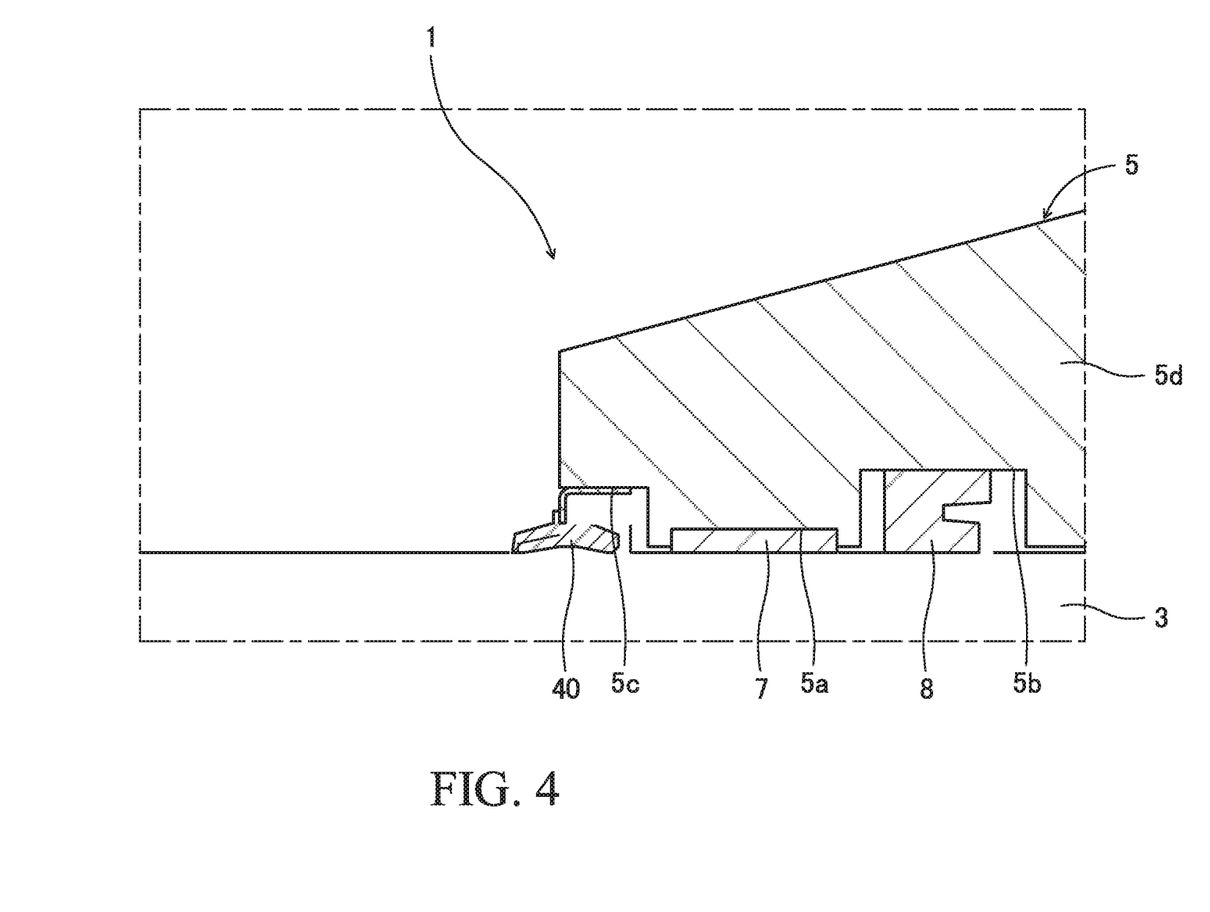
FIG. 4 is an enlarged sectional view of the hydraulic cylinder, which is used in a state in which the fluid leakage detection device is not attached, shown in a manner corresponding to FIG. 2.

In addition, the outer diameter of the press-fitted portion 14 is substantially the same as the outer diameter of the dust seal 40. Thus, as shown in FIG. 4, the dust seal 40 that has been detached from the annular groove 11 of the annular member 10 may be press-fitted to the annular groove 5c in the cylinder head 5 instead of the press-fitted portion 14 of the annular member 10. Therefore, it is possible to use the hydraulic cylinder 1 in a state in which the fluid leakage detection device 100 is removed from the cylinder head 5 and the dust seal 40 is attached to the cylinder head 5.

As described above, with the hydraulic cylinder 1, it is possible to easily switch a state in which the hydraulic cylinder 1 can be used with the fluid leakage detection device 100 attached thereto and a state in which the hydraulic cylinder 1 can be used without the fluid leakage detection device 100.

For example, in a case in which the hydraulic cylinder 1 is used in a state in which the fluid leakage detection device 100 has not been attached, when it is necessary to manage the leaked amount of the working oil due to change in service conditions, it is possible to easily manage the leaked amount of the working oil by attaching the fluid leakage detection device 100. The same applies for the reversed case.

In addition, the sensor holder 20 is provided with a relief valve 60 that is connect to the passage 13 in the annular member 10 in a manner parallel with respect to the pressure sensor 30. Specifically, the sensor holder 20 is formed with a branch passage 23 that is branched from the passage 22, and the relief valve 60 is provided in the branch passage 23. The relief valve 60 opens when the pressure of the working oil in the branch passage 23 reaches a predetermined pressure and discharges the working oil to the outside from the passage 22 through the branch passage 23. As described above, the pressure in the passage 22 is limited to the predetermined pressure by the relief valve 60. In the following, this predetermined pressure will also be referred to as "valve opening pressure".

The valve opening pressure of the relief valve 60 is set so as to be lower than the pressure of the working oil at the time when the press-fitted portion 14 of the annular member 10 is pushed out from the annular groove 5c by the working oil. Therefore, it is possible to prevent the annular member 10 from being subjected to a force that is strong enough to cause the press-fitted portion 14 to be pushed out from the annular groove 5c. With such a configuration, even when the leaked amount is increased due to the lowering of the sealing property of the U-packing 8, it is possible to keep the cylinder head 5 attached to the fluid leakage detection device 100 with a higher reliability.

In addition, the bush 7 is coaxially provided in the inner circumference of the cylinder head 5, not in the inner circumference of the annular member 10. Therefore, the piston rod 3 can be supported so as to be coaxial with respect to the cylinder head 5. By attaching the annular member 10 to the cylinder head 5 so as to be coaxial with each other by press-fitting the press-fitted portion 14 to the annular groove 5c, it is possible to provide the annular member 10 so as to be coaxial with the piston rod 3.

According to the embodiment mentioned above, the advantages described below are afforded.

In the fluid leakage detection device 100, the press-fitted portion 14 of the annular member 10 is press-fitted to the annular groove 5c in the cylinder head 5, and thereby, the annular member 10 is attached to the cylinder head 5. Therefore, it is possible to attach the fluid leakage detection device 100 to the cylinder head 5 with ease relative to a case in which the annular member 10 is attached to the cylinder head 5 by using the fastening member, such as a bolt, etc.

In addition, in the fluid leakage detection device 100, the working oil that leaks from the gap between the outer circumference of the piston rod 3 and the inner circumference of the cylinder head 5 is guided to the passage 13 by the U-packing 50. Therefore, it is possible to guide the working oil to the pressure sensor 30 with a higher reliability, and it is possible to detect the leakage of the working oil with a higher reliability.

In addition, in the fluid leakage detection device 100, because the relief valve 60 is provided, it is possible to prevent the annular member 10 from being subjected to the force that is strong enough to cause the press-fitted portion 14 to be pushed out from the annular groove 5c. Therefore, it is possible to keep the cylinder head 5 attached to the fluid leakage detection device 100 with a higher reliability.

The configurations, operations, and effects of the embodiment of the present invention will be collectively described below.

This embodiment relates to the fluid leakage detection device 100 that detects the leakage of the working oil from the gap between the piston rod 3 and the cylinder head 5, the piston rod 3 being projected out from the cylinder tube 2, the cylinder head 5 being provided on the cylinder tube 2, and the cylinder head 5 being configured such that the piston rod 3 is inserted through the cylinder head 5. The fluid leakage detection device 100 includes: the annular member 10 attached to the cylinder head 5, the annular member 10 being configured such that the piston rod 3 is inserted through the annular member 10; the passage 13 formed in the annular member 10, the passage 13 being configured such that the working oil is guided to the passage 13 from the gap between the outer circumference of the piston rod 3 and the inner circumference of the cylinder head 5; and the pressure sensor 30 configured to detect the working oil guided through the passage 13, wherein the annular member 10 has the press-fitted portion 14, the press-fitted portion 14 being configured to be press-fitted to the annular groove 5c formed in the cylinder head 5.

According to such a configuration, it is possible to attach the annular member 10 to the cylinder head 5 by press-fitting the press-fitted portion 14 of the annular member 10 to the annular groove 5c in the cylinder head 5. Therefore, it is possible to attach the fluid leakage detection device 100 to the cylinder head 5 with ease.

In addition, the fluid leakage detection device 100 further includes the U-packing 50 provided in the inner circumference of the annular member 10, the U-packing 50 being configured to close the gap between the inner circumference of the annular member 10 and the outer circumference of the piston rod 3 so as to guide the working oil to the passage 13 from the gap between the outer circumference of the piston rod 3 and the inner circumference of the cylinder head 5.

According to such a configuration, the working oil that leaks from the gap between the outer circumference of the piston rod 3 and the inner circumference of the cylinder head 5 is guided to the passage 13 by the U-packing 50. Therefore, it is possible to detect the leakage of the working oil with a higher reliability.

The fluid leakage detection device 100 further includes the relief valve 60 connected to the passage 13 in a parallel manner with respect to the pressure sensor 30, the relief valve 60 being configured to open when the pressure in the passage 13 reaches the predetermined pressure, wherein the predetermined pressure is lower than the pressure of the working oil at the time when the press-fitted portion 14 is pushed out from the annular groove 5c by the working oil.

According to such a configuration, because the relief valve 60 is provided, it is possible to prevent the annular member 10 from being subjected to the force that is strong enough to cause the press-fitted portion 14 to be pushed out from the annular groove 5c. Therefore, it is possible to keep the cylinder head 5 attached to the fluid leakage detection device 100 with a higher reliability.

The hydraulic cylinder 1 includes: the cylinder tube 2; the piston rod 3 projected out from the cylinder tube 2; the cylinder head 5 provided on the cylinder tube 2, the cylinder head 5 being configured such that the piston rod 3 is inserted through the cylinder head 5; the annular member 10 attached to the cylinder head 5, the annular member 10 being configured such that the piston rod 3 is inserted through the annular member 10; the passage 13 formed in the annular member 10, the passage 13 being configured such that the working oil is guided to the passage 13 from the gap between the outer circumference of the piston rod 3 and the inner circumference of the cylinder head 5; and the pressure sensor 30 configured to detect the working oil guided through the passage 13, wherein the annular member 10 has the press-fitted portion 14, the press-fitted portion 14 being press-fitted to the annular groove 5c formed in the cylinder head 5.

According to such a configuration, it is possible to attach the annular member 10 to the cylinder head 5 by press-fitting the press-fitted portion 14 of the annular member 10 to the annular groove 5c in the cylinder head 5. Therefore, it is possible to attach the fluid leakage detection device 100 to the cylinder head 5 with ease.

In addition, the hydraulic cylinder 1 further includes the bush 7 provided in the inner circumference of the cylinder head 5, the bush 7 being configured to freely slidably support the piston rod 3.

According to such a configuration, the piston rod 3 can be supported so as to be coaxial with respect to the cylinder head 5.

In addition, the hydraulic cylinder 1 further includes the plurality of bolts 6 projected out from the cylinder head 5, wherein the pressure sensor 30 is arranged between the bolts 6.

According to such a configuration, it is possible to prevent interference between the bolts 6 and the pressure sensor 30. Therefore, it is possible to arrange the pressure sensor 30 in the vicinity of the cylinder head 5 and to reduce the size of the hydraulic cylinder 1.

Although the embodiment of the present invention has been described above, the above embodiment is merely an illustration of one exemplary application of the present invention and is not intended to limit the technical scope of the present invention to the specific configuration of the above embodiment.

In the above-mentioned embodiment, a case in which the reciprocating fluid pressure device is the hydraulic cylinder 1 has been described. The present invention is not limited to this configuration, and the fluid leakage detection device 100 may be used for a shock absorber, etc. as the reciprocating fluid pressure device. In addition, the working fluid is not limited to the working oil, and for example, water and other liquid may be used as the working fluid.

In addition, in the above-mentioned embodiment, a case in which the seal member is the U-packing 8 and 50 has been described. The present invention is not limited to this configuration, and the seal member may be of any type as long as it is arranged, in a compressed state, between the piston rod 3 and the cylinder head 5 or the annular member 10 so as to be able to prevent the leakage of the working oil. For example, the seal member may be an O-ring.

In addition, in the above-mentioned embodiment, a case in which the detector is the pressure sensor 30 has been described. The detector may be a sensor that detects the leakage of the working oil by detecting a strained force of the U-packing 50.

In addition, in the above-mentioned embodiment, the passage 13 opens at the bottom surface of the annular groove 12. The passage 13 may be formed so as to open at an inner circumferential surface of the press-fitted portion 14 by extending through the press-fitted portion 14. In the configuration in which the passage 13 opens at the bottom surface of the annular groove 12, it is possible to reduce the distance between the annular groove 12 and the press-fitted portion 14, and therefore, it is possible to reduce the size of the fluid leakage detection device 100.

The present application claims a priority based on Japanese Patent Application No. 2018-012565 filed with the Japan Patent Office on Jan. 29, 2018, and all the contents of this application are incorporated herein by reference.

The invention claimed is:

1. A fluid leakage detection device for detecting a leakage of working fluid from a gap between a piston rod and a cylinder head, the piston rod being projected out from a cylinder tube, the cylinder head being provided on the cylinder tube, and the cylinder head being configured such that the piston rod is inserted through the cylinder head, the fluid leakage detection device comprising:
   an annular member attached to the cylinder head, the annular member being configured such that the piston rod is inserted through the annular member;
   a passage formed in the annular member, the passage being configured such that the working fluid is guided to the passage from a gap between an outer circumference of the piston rod and an inner circumference of the cylinder head; and
   a detector configured to detect the working fluid guided through the passage, wherein
   the annular member includes a press-fitted portion, the press-fitted portion being configured to be press-fitted to an annular groove formed in the cylinder head.

2. The fluid leakage detection device according to claim 1, further comprising:
   a seal member provided in an inner circumference of the annular member, the seal member being configured to close a gap between the inner circumference of the annular member and the outer circumference of the piston rod so as to guide the working fluid to the passage through the gap between the outer circumference of the piston rod and the inner circumference of the cylinder head.

3. The fluid leakage detection device according to claim 2, wherein:
   the annular member is formed with a seal groove in which the seal member is arranged;
   the seal groove includes a bottom surface to which the working fluid is guided by the seal member; and
   the passage opens at the bottom surface of the seal groove.

4. The fluid leakage detection device according to claim 3, wherein the bottom surface is parallel to an outer surface of the cylinder rod.

5. The fluid leakage detection device according to claim 1, further comprising:
   a relief valve connected to the passage in a parallel manner with respect to the detector, the relief valve being configured to open when a pressure in the passage reaches a predetermined pressure, wherein
   the predetermined pressure is lower than a pressure of the working fluid at a time when the press-fitted portion is pushed out from the annular groove by the working fluid.

6. The fluid leakage detection device according to claim 1, wherein
   an outer diameter of the press-fitted portion is larger relative to an inner diameter of the annular groove formed in the cylinder head, in a state before the press-fitted portion is press-fitted to the annular groove, and only the press-fitted portion is provided in the annular groove.

7. The fluid leakage detection device according to claim 1, wherein only the press-fitted portion is provided in the annular groove.

8. A reciprocating fluid pressure device comprising:
a cylinder tube;
a piston rod projected out from the cylinder tube;
a cylinder head provided on the cylinder tube, the cylinder head being configured such that the piston rod is inserted through the cylinder head;
an annular member attached to the cylinder head, the annular member being configured such that the piston rod is inserted through the annular member;
a passage formed in the annular member, the passage being configured such that the working fluid is guided to the passage from a gap between an outer circumference of the piston rod and an inner circumference of the cylinder head; and
a detector configured to detect the working fluid guided through the passage, wherein
the annular member includes a press-fitted portion, the press-fitted portion being press-fitted to an annular groove formed in the cylinder head.

9. The reciprocating fluid pressure device according to claim 8, further comprising:
a seal member provided in the inner circumference to the cylinder head, the seal member being configured to seal a gap between the outer circumference of the piston rod and the inner circumference of the cylinder head; and
a bearing provided in the inner circumference of the cylinder head, the bearing being configured to freely slidably support the piston rod, wherein,
the seal member and the bearing are arranged a direction in which the piston rod is inserted.

10. The reciprocating fluid pressure device according to claim 8, further comprising:
a plurality of fastening members projected out from the cylinder head, the fastening members being configured to fasten the cylinder head to the cylinder tube, wherein the detector is arranged between the fastening members.

11. A method of manufacturing a reciprocating fluid pressure device, the reciprocating fluid pressure device comprising:
a cylinder tube; a piston rod projected out from the cylinder tube;
a cylinder head provided on the cylinder tube, the cylinder head being configured such that the piston rod is inserted through the cylinder head;
an annular member attached to the cylinder head, the annular member being configured such that the piston rod is inserted through the annular member;
a passage formed in the annular member, the passage being configured such that the working fluid is guided to the passage from a gap between an outer circumference of the piston rod and an inner circumference of the cylinder head; and
a detector configured to detect the working fluid guided through the passage, the method comprising:
providing a press-fitted portion on the annular member, the press-fitted portion having an outer diameter larger relative to an inner diameter of an annular groove formed in the cylinder head; and
press-fitting the press-fitted portion to the annular groove.

* * * * *